United States Patent [19]
Ohtsuka et al.

[11] Patent Number: 5,925,695
[45] Date of Patent: Jul. 20, 1999

[54] CURABLE COMPOSITION, A CURED ARTICLE THEREFROM, AN ASPHALT EMULSION, AN ASPHALT MIXTURE FOR PAVING, AND A CURED ARTICLE THEREFROM

[75] Inventors: Yoshihiro Ohtsuka, Ohtake; Yasuhiro Oshino, Ihara, both of Japan

[73] Assignee: Daicel Chemical Indstries Ltd., Osaka, Japan

[21] Appl. No.: 08/968,006

[22] Filed: Nov. 12, 1997

Related U.S. Application Data

[30] Foreign Application Priority Data

| Nov. 13, 1996 | [JP] | Japan | 8-317104 |
| Nov. 18, 1996 | [JP] | Japan | 8-322207 |
| Nov. 20, 1996 | [JP] | Japan | 8-324658 |
| Nov. 20, 1996 | [JP] | Japan | 8-324659 |

[51] Int. Cl.$^6$ ............... C08L 95/00; B32B 5/16; C08J 5/00; C08K 3/00

[52] U.S. Cl. ............... 524/68; 524/4; 524/8; 524/59; 524/60; 524/66; 524/68; 428/407; 264/331.13; 264/331.15

[58] Field of Search ............... 524/2, 4, 8, 59, 524/60, 61, 66, 68; 428/407, 489; 264/331.13, 331.15

[56] References Cited

U.S. PATENT DOCUMENTS

| 5,399,626 | 3/1995 | Erickson et al. | 525/314 |
| 5,449,718 | 9/1995 | Erickson et al. | 525/314 |
| 5,451,619 | 9/1995 | Kluttz et al. | 524/68 |
| 5,686,535 | 11/1997 | Erickson et al. | 525/314 |
| 5,741,856 | 4/1998 | Masse | 525/92 F |

*Primary Examiner*—Peter A. Szekely
*Attorney, Agent, or Firm*—Morgan & Finnegan LLP

[57] ABSTRACT

Disclosed are a curable composition, a cured article therefrom having improved properties, an asphalt emulsion, an asphalt mixture for paving, and a cured article prepared therefrom having an excellent water permeability.

13 Claims, No Drawings

CURABLE COMPOSITION, A CURED ARTICLE THEREFROM, AN ASPHALT EMULSION, AN ASPHALT MIXTURE FOR PAVING, AND A CURED ARTICLE THEREFROM

FIELD OF THE INVENTION

The present invention relates to a curable composition and a cured article therefrom. Further, the present invention relates to an asphalt emulsion. Still further, the present invention relates to an asphalt mixture for paving and a cured article therefrom.

In more detail, the present invention also relates to a curable composition and a cured article prepared from the curable composition, an asphalt emulsion, and an asphalt mixture for paving in which adhesion properties are improved by mixing an epoxy-modified aromatic vinyl-conjugated diene block copolymer, and a cured article prepared from the asphalt mixture for paving.

BACKGROUND OF THE INVENTION

Asphalt and bituminous materials have been employed in a variety of fields from ancient times, and even at the present time, petroleum asphalt has been widely employed because of an enlargement in utilization of petroleum.

Petroleum asphalt is economical, and it can be ob-tained in a large amount. It is employed in fields such as roads paving, an engineering work for water-utilization, water-proofing engineering work, a waterproofed paper, insulating material for electricity, and a variety of coating materials. As asphalt. A variety of grades of asphalt such as straight asphalt and blown asphalt are supplied which are different in composition and penetration number (hard-ness).

Further, asphalt having an excellent abrasion resis-tance is desired, for example, there are employed improved asphalts in which rubbers and elastomers are mixed and modified asphalt in which a large amount of fillers are mixed.

Heretofore, there are known as a composition for coating the surface of asphalt, cementitious materials, and steel plates, etc., a mixture composed of an epoxy resin and tar, and a mixture composed of an epoxy resin and the above-mentioned asphalt.

However, the former is poor in aging resistance and becomes brittle in cold because of a high brittle temperature when it is cured by mixing with a curing agent. On the other hand, the latter has a drawback being incapable of being prepared a homogeneously curing composition because the epoxy resin and asphalt are apt to be readily separated due to poor compatibility, and the epoxy resin alone coheres. An improved composition is described in JP-B-76022930 Official Gazette. However, it is not still sufficient.

Further, with a recent increase of over-the-road hauling by cars, abrasion has become a serious problem in asphalt paving. In paved roads, since running area of cars is usually one-sided, abrasion of the paved roads is not evenly caused, and hollows by wheels and cracks are apt to be readily caused. Such abrasion in paved roads is exceedingly dangerous for car traffic and, moreover, wear of the paved roads is also accelerated. For that reason, an asphalt having an excellent abrasion resistance is needed, and the above-mentioned improved asphalt and modified asphalt contain-ing a large amount of fillers are employed.

However, the improved asphalt is limited in its improve-ment of abrasion resistance and impact resistance because of 3–5% by weight of rubbers and elastomers, and at most 5–8% by weight are useful. For example, in the case that fillers are mixed in a large amount, a mixture with asphalt mortar and topeka is excellent in abrasion resistance however, the asphalt becomes apt to readily flow at high temperatures during summer season.

Further, the improvement is limited even by a combina-tion of rubber with fillers, and it is not sufficiently satisfied. For that reason, in order to repair the abraded surface of paved roads, although an agent for repairing the abraded asphalt roads is employed by heating, which has same quality as the surface of the roads, it is not sufficient in abrasion resistance, resulting in repeated alternate abrasion and repairing.

Still further, asphalt is usually high in softening point, and it in a viscous liquid-state, semi-solid state, or solid state in ordinary temperatures. Accordingly, it be required that it is melted or softened by heating in use in order to ensure appropriate fluidity for working.

On the other hand, there is a so-called asphalt emulsion in which asphalt is emulsified or suspended in water using an emulsifier so that asphalt can be easily handled. When an emulsion is employed for road paving, shore protection works, roofing, coatings, floor covering, etc., although it is required that aggregates such as crushed stones, sand, and soil are sufficiently combined with cement, concretes, and metals at interlayers thereof, the asphalt emulsion does not show a sufficient adhering ability to the aggregates.

Moreover, in a street area and its circumference, surface of soil is remarkably lost because of road paving and construction of a large amount of buildings, whereby, per-meation of rainwater, etc. is disturbed.

For that reason, there occur problems such as withering of woods, ground subsidence, and flooding of rivers because of concentrated heavy rain.

Water-permeable pavement has been employed for solv-ing these problems, and it makes rain water permeate through the surface of paved roads for preventing the problems. It is known that the water-permeable pavement requires a void ratio of at least 15–25% for the purpose of permeating rain water. Differently from a usual asphalt mixture for pavement in formulation of aggregates, in the water-permeable pavement, for example, there is employed an asphalt mixture for pavement in which there are mixed coarse aggregates such as asphalt concrete having opened pores.

However, in a cured article therefrom, the aggregates are not sufficiently bound each other. Accordingly, it is poor in deformation resistance by traffic load, whereby, the water-permeable pavement has been mainly employed for side-walks.

Further, in the asphalt pavement, hollows by wheels, unevenness, decrease of flatness, and flowing phenomenon are apt to readily occur because of an increase of traffic volume by large-sized vehicles and weather conditions.

Particularly, in the winter season, the surface of the paved roads is remarkably damaged because of abrasion by spike tires and tire chains. For that reason, puddles are formed on the surface of the pavement when raining, and there occur hydroplaning phenomenon and slipping troubles, troubles in vision of view because of splashed water and smoking, resulting in problems in traffic safety and causes of traffic accidents.

Accordingly, also in roadways, utilization of water-permeable pavement has been desired, and the water-permeable pavement is tentatively utilized in many places.

It is to be noted that since the water-permeable pavement has larger voids, the voids dampen noise and vibration by passing of vehicles, preferably resulting in an effect for decreasing the noise, whereby, it is a preferred pavement for streets in downtowns.

However, as described hereinabove, the water-permeable pavement has larger voids compared to usual pavement, and small particle components are not mixed so much in an asphalt mixture for pavement. Accordingly, there is not expected strength by a binding effect of the aggregates.

Therefore, in order to maintain a stability in the water-permeable pavement, there is required a binding material having a strongly binding ability between aggregates. Further, since the water-permeable pavement is employed for usual roadways and speedways, etc., there is required an advanced dynamic stability in the asphalt mixture for the pavement. Since the asphalt mixture for the pavement is usually prepared and employed while heating without exception, there is required a binding material having high viscosity at 60° C.

As a binding material in the asphalt mixture for paving for the water-permeable pavement, there is employed improved asphalt which is improved by a polymer. For example, it is "improved asphalt having ultra high viscosity" which has higher viscosity (more than approximately 200,000 poise) at 60° C. and an exceedingly higher softening point compared to "improved asphalt type II" which is described in "Abstract of an asphalt pavement" published by Japan Road Association which is a corporate juridical person.

Still further, since the water-permeable pavement has larger voids, it is apt to be readily deteriorated under the influence of direct sunlight and air.

For that reason, high viscosity at high temperatures in binding materials is required in order to reduce "dangling" in working by thickening a layer containing the binding materials in the surface of the aggregates.

However, the "improved asphalt having ultra high viscosity" and other improved asphalt show a large change in viscosity with change in temperatures. Accordingly, in the case that the asphalt mixture for pavement is prepared and employed, careful attention must be paid in temperature control, resulting to that it is difficult in use.

Still further, even in the case that the "improved asphalt having ultra high viscosity" is employed, a degree of flow resistance in high temperatures is not still satisfied.

The present invention aims at providing a curable composition, a cured article molded from the curable composition, an asphalt emulsion, an asphalt mixture for paving, and a cured article prepared from the asphalt mixture.

SUMMARY OF THE INVENTION

A first aspect of the present invention relates to a curable composition which comprises (a) 10–90% by weight of an epoxy-modified diene-based block copolymer containing a polymer block consisting of an aromatic vinyl compound and a polymer block consisting of a compound having a conjugated double bond, in which unsaturated double bonds are partially epoxidized, (b) 90–10% by weight of asphalt [the components (a) and (b) are 100% by weight as a whole], and (c) a curing agent for an epoxy-based resin.

A second aspect of the present invention relates to a cured article molded from the curable composition of the first aspect.

A third aspect of the present invention relates to an asphalt emulsion which comprises; (i) 100 parts by weight of asphalt, (ii) 5–100 parts by weight of an epoxy-modified diene-based block copolymer containing a polymer block consisting of an aromatic vinyl compound and a polymer block consisting of a compound having a conjugated double bond, in which unsaturated double bonds are partially epoxidized, (iii) 30–800 parts by weight of water, and (iv) 0.06–8 parts by weight of an emulsifier.

A fourth aspect of the present invention relates to an asphalt mixture for paving which comprises 1–5 parts by weight of fillers, 1–15 parts by weight of a water-hardenable inorganic material, 2–15 parts by weight of a modified asphalt emulsion containing an epoxy-modified diene-based block copolymer, and 100 parts by weight of aggregates.

A fifth aspect of the present invention relates to a cured article prepared from the asphalt mixture for paving.

DETAILED DESCRIPTION OF THE INVENTION

Hereinafter, the present invention is described in more detail.

According to a first aspect of the present invention, there is provided a curable composition which comprises (a) 10–90% by weight of an epoxy-modified diene-based block copolymer containing a polymer block consisting of an aromatic vinyl compound and a polymer block consisting of a compound having a conjugated double bond, in which unsaturated double bonds are partially epoxidized, (b) 90–10% by weight of asphalt [the components (a) and (b) are 100% by weight as a whole], and (c) a curing agent for an epoxy-based resin.

According to a second aspect of the present invention, there is provided a cured article prepared from the curable composition of the first aspect.

The first aspect of the present invention essentially includes an epoxy-modified diene-based block copolymer containing a polymer block consisting of an aromatic vinyl compound and a polymer block consisting of a compound having a conjugated double bond, in which unsaturated double bonds are partially epoxidized.

The epoxy-modified diene-based block copolymer containing a polymer block consisting of an aromatic vinyl compound and a polymer block consisting of a compound having a conjugated double bond, in which unsaturated double bonds are partially epoxidized is employed as a modifier for asphalt in the present invention.

The epoxy-modified diene-based block copolymer essentially contains a polymer block consisting of an aromatic vinyl compound and a polymer block consisting of a compound having a conjugated double bond, and in the epoxy-modified diene-based block copolymer, remained unsaturated double bonds are partially epoxidized.

In the epoxy-modified diene-based block copolymer, the aromatic vinyl compound specifically includes, for example, styrene, alpha-methylstyrene, vinyl toluene, p-tert-butylstyrene, divinylbenzene, p-methyl styrene, 4-n-propyl styrene, 2,4-dimethylstyrene, 3,5-diethyl styrene, 1,1-diphenylstyrene, 2,4,6-trimethyl styrene, 4-cyclohexylstyrene, 3-methyl-5-n-hexyl styrene, and the like.

Although one or more of aromatic vinyl compounds may be employed, styrene is frequently and preferably employed.

In the epoxy-modified diene-based block copolymer, the compound having a conjugated double bond specifically includes, for example, butadiene, isoprene, 1,3-pentadiene, 2,3-dimethyl-1,3-butadiene, piperylene, 3-butyl-1,3- octadiene, 1-phenyl-1,3-butadiene, 1,3-octadiene, 4-ethyl-1, 3-hexadiene, and the like.

Although one or more of compounds having a conjugated double bond may be employed, butadiene, isoprene, piperylene and mixtures thereof are frequently and preferably employed.

The epoxy-modified diene-based block copolymer in the present invention essentially includes a polymer block A consisting of aromatic vinyl compound and polymer block B consisting of the compound having a conjugated double bond.

The copolymerization ratio (weight ratio) of the aromatic vinyl compound with respect to the compound having a conjugated double bond is generally 5/95 to 70/30, preferably 10/90 to 70/30, and more preferably 10/90 to 60/40.

The number average molecular weight of the block copolymer to be employed in the present invention is generally from 5,000 to 1,000,000, preferably 10,000 to 800,000, and the molecular weight distribution [the ratio (Mw/Mn) of a weight average molecular weight (Mw) to a number average molecular weight (Mn)] is less than 10.

The molecular weights (Mn) and (Mw) are a molecular weight measured by a GPC method, and which is based on a standard Polystyrene.

In the case that the number average molecular weight is less than 5,000, there are not shown characteristics of the epoxy-modified diene-based block copolymer and, contrarily, in the case of exceeding 500,000, rubbery elasticity is not sufficiently shown.

The block copolymer consisting of the aromatic vinyl compound and compound having a conjugated double bond is represented by general configurations, for example, of $(A-B)_nA$, $(B-A)_n$, $(A-B-)_4Si$, and the like. Of them, the $(A-B)_nA$ type copolymer is generally employed.

The molecular structure of the block copolymer to be employed in the present invention may be any of linear, branched and radial types and any combination thereof.

In the block copolymer, the aromatic vinyl compound may be distributed equally or while increasing or reducing in a tapered state. Further, a copolymerized portion may be include a plurality of portions in which the aromatic vinyl compound is distributed equally and/or in the tapered state, respectively. Unsaturated bonds remaining in the block copolymer derived from a conjugated double bond may be partially hydrogenated.

Block copolymer consisting of the aromatic vinyl compound and compound having a conjugated double bond, the preparation processes thereof, and the uses thereof are disclosed in detail, for example, in U.S. Pat. No. 3,265,765, 3,280,084, 3,281,383, 3,333,02, 3,432,323, 3,507,934, 3,607,977, 3,637,554, 3,639,517, 3,652,732, 3,792,005, 3,872,068, 3,993,613, 4,051,197, 4,080,407, 4,086,298, 4,584,346, 4,704,434, 4,879,34, 5,001,199, 5,039,755, 5,130,377, and 5,264,480, JP-B-65023798, JP-B-72003252, JP-B-71032415, JP-B-81028925, JP-B-73002423, and JP-B-810289-25, etc.

Copolymerization of the above-mentioned aromatic vinyl compound and compound having a conjugated double bond is effected in a non-polar solvent, specifically an aromatic hydrocarbon such as benzene, toluene, xylene, ethylbenzene and the like, and aliphatic hydrocarbon such as n-hexane, cyclohexane, and the like, in the presence of an organolithium initiator such as methyllithium, n-butyllithium, n-decyllithium, tert-butyllithium, phenyllithium, naphthyllithium, p-tolyllithium, cyclohexyllithium, cyclophenyllithium, and the like.

The amount of organolithium initiator can vary depending on the desired molecular weight of the final product, and it would generally range from 1 to 50 gram millimole based on 100 gram of monomers.

The block copolymer is prepared by a polymerization process employing sequential polymerization of the above-mentioned aromatic vinyl compound and compound having a conjugated double bond.

In sequential polymerization, non elastomeric blocks or segments are first formed by multiple additions of aromatic vinyl compound and organolithium initiator.

Subsequently, the compound having a conjugated double bond is added and polymerized to form an elastomeric polymer block. Polymerization may be carried out at approximately −20° C. to 150° C., preferably 20° C. to 100° C.

Although the reaction period would depend upon polymerization conditions, it is generally within 48 hours, preferably up to 24 hours. At the conclusion of polymerization, a polyfunctional treatment agent is added to the unquenched reaction mixture.

The polyfunctional treatment agent which is allowed to react must contain at least three reactive points capable of reacting with the lithium-carbon bond in the polymer and thereby coupling the agent to the polymer at this bond. For that reason, compounds containing active hydrogen atoms such as water, alcohols, acids, and the like are to be avoided in polymerization since such compounds replace the lithium atom with hydrogen and do not effect the desired coupling.

Types of polyfunctional treatment agents which can be employed include polyepoxides, polyisocyanates, polyimides, polyaldehydes, polyketones, polyanhydrides, polyesters, polyhalides, and the like.

Although any polyepoxides can be preferably employed, those which are liquid are especially preferred because they can be readily handled and form a relatively small nucleus for the polymer.

Preferred polyepoxides include epoxidized hydrocarbon polymer such as epoxidized liquid polybutadiene and epoxidized vegetable oils such as epoxidized soybean oil and epoxidized linseed oil, and the like.

The amount of polyfunctional treatment agent to be employed is approximately 1.0 to 1.5 equivalents of polyfunctional treatment agent based on the lithium present in the resulting copolymer.

After polymers have been allowed to react with the poly-functional treatment agent, they are recovered by treatment with a material containing active hydrogen such as an alcohol.

Copolymerization may be carried out by one-stage copolymerization. In one-stage copolymerization, the block copolymer is formed by the difference in reaction rate between the aromatic vinyl compound and compound having a conjugated double bond.

The epoxy-modified diene-based block copolymer can be prepared by epoxidation of unsaturated bonds remaining derived from a conjugated double bond in the thus-obtained block copolymer.

The epoxidation can be carried out using an epoxidation agent such as peracids or hydroperoxides, in the form of a solution or a slurry in which an appropriate organic solvent is employed.

Peracids include performic acid, peracetic acid, perpropionic acid, perbenzoic acid, trifluoroperacetic acid, and the like. Of these peracids, peracetic acid is the preferred epoxidation agent, because it is available on an industrial basis at a moderate price and has a high stability. Hydroperoxides include hydroperoxide, tertiarybutylhydroperoxide, cumenperoxide, metachloroperbenzoic acid, and the like.

In the epoxidation, a catalyst can be used as appropriate to the circumstances.

For example, in the case when peracetic acid is used as an epoxidation agent, an alkali such as sodium carbonate and an acid such as sulfuric acid can be used as a catalyst. Furthermore, in the case of using hydroperoxides, it is possible to obtain a catalytic effect, for example, using a mixture of tungstic acid and sodium hydroxide with hydrogen peroxide, or hexacarbonylmolybudenum with tertiary butyl hydroperoxide.

The epoxidation is carried out in the absence or presence of a solvent, while controlling the reaction temperature according to the apparatus to be used and properties of raw materials.

The temperature region of the epoxidation can be selected based on the reactivity of the epoxidation agent.

In the case of peracetic acid, which is the preferable epoxidation agent, the preferred temperature is 0 to 70° C.

If the temperature is under 0° C., the reaction rate is slow but, if the temperature exceeds 70° C., peracetic acid can decompose.

In tertiarybutylhydroperoxide/molybdenumdioxide diacetyl acetate, which is an example of a hydroperoxide, the preferable temperature is 20° C. to 150° C., based on the same consideration.

The use of solvents for dilution is effective for lowering the reaction rate of raw materials and stabilizing the epoxidation agent. In the case when peracetic acid is used as the epoxidation agent, preferred solvents include aromatic compounds such as benzene, toluene, and xylene, a hydrocarbon such as hexane and cyclohexane, a halogenated compound such as carbontetrachloride and chloroform, and ester compounds such as ethyl acetate.

Of these solvents, ethyl acetate is especially preferred. The molar ratio of the epoxidation agent to be used with respect to unsaturated bonds is selected based on the proportion of unsaturated bonds which it is desired to retain. When preparing epoxy compositions having many epoxy groups, an equal or higher molar ratio of epoxidation agents to unsaturated bonds is preferably used, but using amounts of epoxidation agents at a molar ratio exceeding 10/1 with respect to unsaturated bonds is not preferable because of the cost and side reactions described hereinafter. With peracetic acid, a preferable molar ratio is 1/1 to 5/1.

The preferred epoxy equivalent in the epoxy-modified aromatic vinyl-conjugated diene block copolymer is 140 to 2,700, and preferably 200 to 2000.

The epoxy-modified aromatic vinyl-conjugated diene block copolymer having epoxy equivalent of less than 140 cannot be substantially prepared in an industrial fashion, because aromatic vinyl-conjugated diene block copolymer which is a starting material generally has a content of diene moiety of 90% by weight at most.

Even though the diene moiety is completely epoxidized, resultant epoxy groups are partially ring-opened, resulting in partially gelling and not attaining to values more than epoxy equivalent of 140.

On the other hand, in the case that the epoxy equivalent exceeds 2,700, the use of the epoxy-modified diene-based block copolymer becomes meaningless.

It is noted that epoxy equivalent values were measured by titration method using brominated hydrogen acid, and calculated by the following equation.

Epoxy equivalent=10000×[weight(g) of an epoxy-modified diene-based block copolymer]/[titration amount (milliliter) of 0.1 N brominated hydrogen acid×factor of brominated hydrogen acid]

The epoxy-modified diene-based block copolymer obtained can be separated in the form of foamed cram-state, particles state, powder state, strand state, pellet state, and sheet state from a crude reaction solution by appropriate procedures, for example, reprecipitation with a bad solvent, solvent removed by distillation after copolymer was poured (steam stripping) into hot water while agitating, or by a direct solvent removal.

The epoxy-modified diene-based block copolymer, preparation processes thereof are disclosed in detail, for example, in U.S. Pat. Nos. 3,551,518, 3,555,112, 3,607,982, 3,699,184, 4,051,199, 4,131,725, 4,135,037, 4,341,672, 5,229,464, etc., and the utilization fields thereof are described in EP Application No. 94401374.1.

In the curable composition of the first aspect of the present invention, other epoxy resins can be employed together with the epoxy-modified diene-based block copolymer in order to improve curability in the curable composition. The other epoxy resins include a bisphenol A type epoxy resin, a bisphenol F type epoxy resin, a cresol novolak type epoxy resin, an cycloaliphatic epoxy resin, and a phenol novolak type epoxy resin, etc.

In the following, the component (b) in the first aspect is described below.

As asphalt which is the component (b) to be employed in the first aspect of the present invention, there are exemplified petroleum asphalt and natural asphalt. The natural asphalt includes asphaltite such as Gilsonite, lake asphalt such as Trinidad asphalt and rock asphalt, grahami-te and glancepitch. The petroleum asphalt includes straight asphalt which is obtained by distillation of a crude oil, cut-back asphalt, blown asphalt which is produced by blowing an oxygen-containing gas into straight asphalt or catalytically oxidized, semi-blown asphalt, and solvent-extracted asphalt such as a propane-extracted asphalt. Of those, asphalt having penetration number (25° C.) of 10–300 is preferred. One or more kinds of asphalt can be employed.

It is to be noted that as asphalt to be employed in the third and fourth aspects of the present invention which are described hereinafter, although there are exemplified the above-mentioned asphalt, asphalt having penetration number of 40–300, and preferably 40–200 is employed. In the third and fourth aspects of the present invention, a mixing property between aggregates, fillers, and water-hardenable inorganic materials can be improved by mixing the asphalt emulsion.

In the curable composition of the first aspect in the present invention, there are mixed 90–10% by weight of asphalt of the epoxy-modified diene-based block copolymer (a) and 10–90% by weight of the asphalt (b) each other. The components (a) and (b) are 100% by weight as a whole.

In the case that the asphalt (b) is less than 10% by weight, there becomes remarkable properties of the epoxy-modified diene-based block copolymer (a) and extension becomes poor in the cured article of the second aspect and, contrarily, in the case that asphalt (b) exceeds 90% by weight, an adhering property and pressurization resistance become poor in the cured article of the second aspect of the present invention. The asphalt (b) is preferably employed in a mixing proportion of 20–80% by weight, and more preferably, 40–60% by weight.

Further, in the curable composition of the first aspect in the present invention, tar can be employed together with the epoxy-modified diene-based block copolymer (a) and the asphalt (b). As the tar to be mixed, there can be exemplified petroleum tar, oil gas tar, and improved tar thereof. The tar can be mixed solely or in combination of two or more kinds. The tar has an effect for improving dispersibility between the epoxy-modified diene-based block copolymer (a) and the asphalt (b). The tar may be employed solely or in combination.

Mixing amount of the tar is at most 100 parts by weight based on 100 parts by weight of the total amount of the epoxy-modified diene-based block copolymer (a) and the asphalt (b).

In the case that the mixing amount of the tar exceeds 100 parts by weight, tackiness is unpreferably remained in the cured article in the second aspect, and weatherability becomes unpreferably poor.

In the following, a curing agent for an epoxy-based resin which is the component (c) in the first aspect is described below.

It is to be noted that the epoxy-based resin includes the epoxy-modified diene-based block copolymer which is the component (a) and the above-mentioned other epoxy resin.

The curing agent for an epoxy-based resin specifically includes aliphatic polyamines, aromatic polyamines, improved aliphatic polyamines, polyamide amines, a variety of mercaptan-based curing agents, a liquid NBR having amino groups at terminals, a liquid NBR having carboxylic groups at terminals, an organic acid, an organic acid anhydride, a latent curing agent, an aliphatic hydroxypolyamine, a modified polyamine thereof, an amine-adduct, a polyamide, ketimines, tertiary amines, imidazoles, BF amine complexes, acid anhydrides, dimer acids, trimer acids, and liquid polysulfide rubbers, etc., which are employed as a curing agent for usual epoxy resins. The curing agent for an epoxy-based resin may be employed solely or in combination.

The curing agent for an epoxy-based resin is mixed in an equivalent ratio of from 0.8/1 to 1.5/1 based on total epoxy equivalent in the epoxy-modified diene-based block copolymer and the above-mentioned other epoxy resin.

Still further, in the curable composition of the first aspect in the present invention, there can be optionally mixed thermoplastic solid resins and solid rubbers as a material for improving a tackifying property, softening agents, plasticizers, anti-aging agents, anti-oxidants, and sulphur, etc. In addition, there may be optionally mixed natural rubbers, synthetic rubbers, and elastomers such as synthetic resins, etc. in order to improve physical properties such as plasticity.

Moreover, in the curable composition of the first aspect in the present invention, there can be optionally employed solvents in order to control the viscosity of the curable composition. As the solvents to be employed, there can be employed volatile solvents such as aliphatic solvents, chlorine-based solvents, and aromatic-based solvents. Also, the curable composition of the first aspect in the present invention can be employed as an asphalt concrete-like or mortar-like mixture by mixing aggregates such as coarse aggregates and fine aggregates, and stone powders. A cured article therefrom containing the aggregates is advantageous in compression strength, and further flexibility and an adhering property.

In the present invention, the coarse aggregates have sizes capable of being retained on a sieve having mesh of 2.36 mm, which have been usually employed in asphalt paving, and the fine aggregates have sizes capable of passing through the sieve having mesh of 2.36 mm and not capable of passing through a sieve having mesh of 0.075 mm, which have also been usually employed in asphalt paving.

Specifically, the aggregates include crushed stones, crusher runs, screenings, dusts of crushed stone, and sand.

Further, there can be also employed light aggregates and hard aggregates. The light aggregates include Luksobite, Sinopal, aluminum powder, ceramic particles, plastics particles, and colored aggregates. The hard aggregates include emery and silica sand, etc.

The curable composition of the first aspect in the present invention shows an excellent adhering property to cement, asphalt concrete, stone materials, and metallic materials, and a cured article from the curable composition is exceedingly useful as a protection layer having flexibility, abrasion resistance, oil resistance, water resistance, water proofing property, and weatherability in outdoors. Particularly, in the case that it is coated and cured over the surface of roads for cement or asphalt paving, an effect for protecting the surface of the roads is remarkable because of a combined layer, which has been not shown in a conventional paving materials.

It is to be noted that aggregates precoated by asphalt may be also employed.

In the case that the curable composition of the first aspect in the present invention is coated on the surface of roads, and there are scattered aggregates such as silica sand, sand, crushed stones for paving, artificial crushed stones, emery, Alundum, Corundum, Carborundum, Sinopal, and metallic particles, etc. over the curable composition before or during curing, the scattered aggregates can form an abrasion resistible layer which has an excellent effect for prevention of slipping due to a combined layer with the aggregates by a strong adhering property of the composition. Coating is carried out by brushing and spraying, etc., and the thickness of the coating layer can be freely controlled by selecting a coating amount or multi-layer coating depending upon purposes or uses.

Although the cured article of the second aspect in the present invention can be obtained even by only letting the curable composition of the first aspect cure at ordinary temperatures, it may be also heated. Curing time of period ranges from 1 to 24 hours, and preferably 2 to 5 hours.

In the first aspect of the present invention, the component (c) is mixed for a period of 10 to 180 minutes, preferably 30–60 minutes before coating or molding. In the case that it is less than 10 minutes, the working time period is not sufficient and, contrarily, in the case that it exceeds 180 minutes, curing of the curable composition finishes to progress before coating or molding, unpreferably resulting in becoming incapable of coating or molding.

Curing time can be controlled by selecting the kind of the curing agent and asphalt, and by controlling the total epoxy equivalent of the epoxy-modified diene-based block copolymer and the other epoxy resins, and further, by employing a curing retardant.

According to a third aspect of the present invention, there is provided an asphalt emulsion which comprises; (i) 100 parts by weight of asphalt, (ii) 5–100 parts by weight of an epoxy-modified diene-based block copolymer containing a polymer block consisting of an aromatic vinyl compound and a polymer block consisting of a compound having a conjugated double bond, in which unsaturated double bonds are partially epoxidized, (iii) 30–800 parts by weight of water, and (iv) 0.06–8 parts by weight of an emulsifier.

In the asphalt emulsion of the third aspect in the present invention, the same asphalt as in the first aspect can be employed without any limitation.

In the asphalt emulsion of the third aspect in the present invention, the epoxy-modified diene-based block copolymer may be mixed in an amount of 5–100 parts by weight based on 100 parts by weight of the asphalt. In the case that the epoxy-modified diene-based block copolymer is less than 5 parts by weight, an appropriate emulsion having a sufficient property cannot be obtained and, contrarily, in the case that it exceeds 100 parts by weight, physical properties of asphalt lower and costs increase in the asphalt emulsion.

In the asphalt emulsion of the third aspect, the number average molecular weight of the block copolymer is preferably 5,000 to 500,000, and more preferably 10,000 to 100,000. In the case that the number average molecular weight is less than 5,000, there is not shown rubbery elasticity in the epoxy-modified diene-based block copolymer and, contrarily, in the case of exceeding 500,000, asphalt is not appropriately emulsified.

In the asphalt emulsion of the third aspect in the present invention, the epoxy-modified diene-based block copolymer may be mixed with other epoxy resins within a range, for example, at most 50%, in which properties are not deteriorated in the asphalt emulsion of the present invention.

The other epoxy resins to be mixed is a compound having at least one epoxy groups in the molecule, and most specifically, it is a condensate between a compound containing bisphenol A unit and an epihalohydrin. For example, there are exemplified "Epikote 815", "Epikote 828", "Epikote 834", "Epikote 1001", and "Epikote 1004" which are manufactured by Yuka Shell Kagaku, Ltd., and which are a liquid state or solid resin which primarily contains a glycidylether of bisphenol A. Further, there can be employed a glycidylether of bisphenol F, a glycidylether of a dimer acid, a glycidylether of a polyalkyleneglycol, a glycidylether of an adduct in which an alkyleneoxide is added to bisphenol A, an aliphatic glycidylether, a glycidylether of a urethane-modified bisphenol A, an aliphaticaromatic copolycondensated glycidylether, vinylcyclohexane dioxide, dicyclopentadiene oxide, a glycidylether of a hydrogenated bisphenol A, and an epoxy-modified polybutadiene, etc. The other epoxy resins may be employed solely or in combination of two or more kinds.

Water which is the component (iii) is employed in an amount of 30–800 parts by weight, and preferably 50–200 parts by weight based on 100 parts by weight of the asphalt. In the case that the amount of water is less than 30 parts by weight, viscosity of the emulsion is too high and, contrarily, in the case of exceeding 800, a long period is required for curing, and asphalt is not sufficiently cured.

In the asphalt emulsion, solid content preferably ranges from 30 to 80% by weight, more preferably from 50 to 70% by weight. In the case that it is less than 30% by weight, a long time is unpreferably required for curing and, contrarily, in the case that it exceeds 80% by weight, viscosity becomes too high, unpreferably resulting in that handling becomes worse.

The emulsifier which is the component (iv) is employed in an amount of 0.06–8 parts by weight based on 100 parts by weight of the asphalt, 5–100 parts by weight of the epoxy-modified diene-based block copolymer, and 30–800 parts by weight of water.

Although a preferred use amount of the emulsifier varies depending upon the kind of the asphalt and the epoxy-modified diene-based block copolymer, it is employed in an amount of 0.06–8 parts by weight based on 100 parts by weight of the asphalt, and 0.2–10% by weight based on the amount of water. In the case that the emulsifier is less than 0.2% by weight, stability becomes worse in the asphalt emulsion obtained and, contrarily, in the case of exceeding 10% by weight, it becomes disadvantageous in view of economy.

As the emulsifier to be employed, there can be exemplified anionic-based surface active agents, cationic-based surface active agents, nonionic-based surface active agents, amphoretic surface active agents, and clays such as Bentonite. By the use of the emulsifiers, there can be prepared a variety of anionic-, cationic-, nonionic-, and clay-type asphalt emulsions.

The emulsifier specifically includes a coconut amine acetate, a stearyl amine acetate, a coconut amine salt of hydrochloric acid, a stearyl amine salt of hydrochloric acid, an alkyl amine salt of stearyl amine oleate, etc., a quaternary ammonium salt such as lauryltrimethyl ammonium chloride, stearyltrimethyl ammonium chloride, alkylbenzyldimethyl ammonium chloride, a cationic surface active agent such as a benzalkonium-type invert soap, an anionic surface active agent such as a salt of alkylnaphthalene sulfonic acid, a salt of dialkyl sulfosuccinic acid, a salt of alkyldiallylether sulfonic acid, a salt of alkylphosphoric acid, a salt of a polyoxyethylenealkyl or alkylallylether sulfuric acid ester, a nonionic surface active agent such as a polyoxyethylene alkylether, a polyoxyethylene alkylphenylether, a fatty acid ester of sorbitan, a fatty acid ester of a polyoxyethylene sorbitan, a fatty acid ester of a polyethyleneglycol, and a polyoxyethylene alkylamine.

The emulsifier acts as an agent for dispersing asphalt and the epoxy-modified diene-based block copolymer into water. The emulsifier may be employed alone or in combination of two or more kinds. Further, there can be employed alkalis, acids, salts, protecting colloid, and dispersants as well as the emulsifier for asphalt.

The asphalt emulsion of the third aspect in the present invention can be prepared without any limitation, and there can be employed conventional methods for the preparation thereof. For example, there is exemplified a method that thermally-melted asphalt and the epoxy-modified diene-based block copolymer are mixed into an emulsion in which the emulsifier is dispersed in water.

Further, there can be employed a method that after the epoxy-modified diene-based block copolymer is mixed with the asphalt fused by heating to prepare a mixture, the mixture is mixed into an emulsion in which the emulsifier is dispersed in water, and a method that asphalt is dispersed into an emulsion in which the epoxy-modified diene-based block copolymer is dispersed in water.

In order to prepare the asphalt emulsion in which a mixture of the asphalt with the epoxy-modified diene-based block copolymer is dispersed in a fine particle-state, there are employed emulsifying equipment such as a colloid mill, a homogenizer, and a high-speed agitator.

Still further, the asphalt emulsion of the present invention may optionally include various additives for conventional asphalt emulsion, for example, fillers or reinforcing materials such as silica, talc, calcium carbonate, powdered minerals, glass fibers and pigments, and the like, which have been conventionally employed in an asphalt emulsion field.

In addition, the asphalt emulsion may include softeners such as paraffin-based-, naphthene-based- and aromaticbased-process oils, resins having tackiness such as coumarone-indene resins and terpene resins, foaming agents such as azodicarbonamide, olefinic thermoplastic resins such as atactic polypropylene, ethylene-ethylacrylate copolymers, aromatic-based thermoplastic resins having a low molecular weight, natural rubbers, synthesized rubbers such as polyisoprene rubbers, polybutadiene rubbers, styrene-butadiene rubbers, ethylene-propylene rubbers, chloroprene rubbers, acrylic rubbers, polyisopreneisobutylene rubbers, polypentenamer rubbers, styrenebutadiene-based block copolymers and styrene-isoprene-based block copolymers, and the like.

In the case that the asphalt emulsion obtained is employed, heating is not required. It is employed by spraying over the surface of roads or by mixing with aggregates. Emulsion particles in the asphalt emulsion are broken by contact with the aggregates, and asphalt layer containing the epoxy-modified diene-based block copolymer cured is formed over the surface of the aggregates, whereby, aggregates are bound to each other.

The asphalt emulsion of the third aspect in the present invention can be utilized in a variety of fields such as a proofing asphalt, a flooring asphalt, a water protecting sheet, a water-sealing material, a silencer sheet, a coating material for a steel pipe, in addition to road paving.

According to a fourth aspect of the present invention, there is provided an asphalt mixture for paving which comprises 1–5 parts by weight of fillers, 1–15 parts by weight of a water-hardenable inorganic material, 3–15 parts by weight of a modified asphalt emulsion containing an epoxy-modified diene-based block copolymer, and 100 parts by weight of aggregates.

In the asphalt mixture for paving of the fourth aspect in the present invention, as the aggregates, the same ones as in the first aspect can be employed without any limitation.

In the asphalt mixture for paving of the fourth aspect in the present invention, as the fillers, there can be employed filler components of screening, stone powder, incinerator ash, clay, talc, fly ash, carbon black, rubber powder and particles, cork powder and particles, wood powder and particles, resin powder and particles, inorganic fibers, pulps, synthetic fibers, and carbon fibers, etc.

Use amount of the fillers is preferably 1–5 parts by weight based on 100 parts by weight of aggregates, which varies depending upon the kind of aggregates and fillers, and formulation in the asphalt emulsion.

In the case that it is less than 1 part by weight, a thick layer from the asphalt emulsion can not be sufficiently formed over the surface of the aggregates and, contrarily, in the case that it exceeds 5 parts by weight, there is unpreferably shown a tendency of lowering in an adhesive property and covering property to the aggregates by the asphalt emulsion.

In the asphalt mixture for paving of the fourth aspect in the present invention, as the water-hardenable inorganic material, there can be employed cement, an anhydrous plaster, a semi-hydrous plaster, and blast furnace slag powder. As the cement, there are exemplified general Portland cement, rapid-strengthening Portland cement, ultra rapid-strengthening Portland cement, moderately thermal-hardenable Portland cement, white Portland cement, blast furnace cement, silica cement, fly ash cement, alumina cement, expansive cement, sulphate-resistible cement, jet cement, blast furnace colloid cement, colloid cement, and ultra rapid-hardenable cement, etc.

Use amount of the water-hardenable inorganic material is preferably 1–15 parts by weight, more preferably 3–9 parts by weight based on 100 parts by weight of aggregates.

In the case that it is less than 1 part by weight, stability lowers in a cured article prepared from the asphalt mixture for paving and, contrarily, in the case that it exceeds 15 parts by weight, stiffness becomes too strong in a cured article prepared from the asphalt mixture for paving, unpreferably resulting in causing cracks because of lack of flexibility.

It is to be noted that there can be optionally mixed publicly-known additives for usual cement together with the water-hardenable inorganic material. The additives include a shrinkage-compensating material, a curing accelerator, a curing retarder, a dispersant, a thickener, and a water-reducing agent, etc.

In the asphalt mixture for paving of the fourth aspect in the present invention, the modified emulsion contains 10–100 parts by weight, and more preferably 20–50 parts by weight of the epoxy-modified diene-based block copolymer based on 100 parts by weight of asphalt.

In the case that the epoxy-modified diene-based block copolymer is less than 10 parts by weight, adhesive ability and holding power to the aggregates unpreferably decrease after curing of the modified emulsion and, contrarily, in the case of exceeding 100 parts by weight, cohesive strength becomes too strong, resulting in that peeling from the aggregates is rather caused, and it is not economical.

In the modified asphalt emulsion containing an epoxy-modified diene-based block copolymer, as the epoxy-modified diene-based block copolymer and asphalt, there can be employed the same ones as the curable composition of the first aspect.

Further, in the modified asphalt emulsion containing an epoxy-modified diene-based block copolymer, rubbers or thermoplastic polymers are preferably employed together with the epoxy-modified diene-based block copolymer.

Viscosity in the modified asphalt emulsion can be increased by mixing of the rubbers or thermoplastic polymers, whereby, a tendency of "dangling" is lightened in working of the asphalt mixture for paving. As the rubbers, there are exemplified natural rubbers, guttapercha, a styrene-butadiene rubber, a styrene-isoprene rubber, an isoprene rubber, a polyisobutylene rubber, a butadiene rubber, a chloroprene rubber, a butyl rubber, a halogenated butyl rubber, a chlorinated polyethylene, a chloro-sulphonated polyethylene, an ethylene-propylene rubber, an EPT rubber, an alfine rubber, a styrene-butadiene block-copolymerized rubber, and a styrene-isoprene block-copolymerized rubber.

As the thermoplastic polymers, there are exemplified an ethylene-vinylacetate copolymer, an ethylene-acrylate copolymer, a polyethylene, a polypropylene, and a vinyl acetate-acrylate copolymer, etc. There can be employed one or more of the rubbers or thermoplastic polymers.

Use amount of the modified asphalt emulsion containing an epoxy-modified diene-based block copolymer is 2–15 parts by weight, preferably 5–10 parts by weight based on 100 parts by weight of aggregates.

In the case that it is less than 2 parts by weight, a thick layer from the asphalt emulsion can not be sufficiently formed over the surface of the aggregates, resulting in that an excellent property is not shown in the asphalt mixture for paving, and durability becomes poor and, contrarily, in the case that it exceeds 15 parts by weight, stability rather lowers in the asphalt mixture for paving.

Still further, in the asphalt mixture for paving of the fourth aspect in the present invention, an emulsion containing a thermosetting resin may be additionally mixed.

It is employed in an amount of 0.2–3 parts by weight, preferably 0.3–2.0 parts by weight based on 100 parts by weight of aggregates.

In the case that it is less than 0.2 parts by weight, a strong layer can not be formed over the surface of the aggregates, resulting in that durability becomes poor in the asphalt mixture for paving and, contrarily, in the case that it exceeds 3 parts by weight, impact resistance rather lowers in a cured article obtained from the asphalt mixture for paving.

The emulsion containing a thermosetting resin is composed of an epoxy resin and a curing agent thereof which are employed in an emulsion state, respectively. The emulsion includes an anion type, a nonionic type, and a cation type. Of those, the nonionic type is more preferred.

In the emulsion, water content is less than 50% by weight, and preferably 40% by weight.

The epoxy resin includes a compound having at least one epoxy groups in the molecule, and most specifically, it is a condensate between a compound containing bisphenol A unit and an epihalohydrin. For example, there are exemplified "Epikote 815", "Epikote 828", "Epikote 834", "Epikote 1001", and "Epikote 1004" which are manufactured by Yuka Shell Kagaku, Ltd., and which are a liquid state or solid resin which primarily contains a glycidylether of bisphenol A. Further, there can be employed a glycidylether of bisphenol F, a glycidylether of a dimer acid, a glycidylether of a polyalkyleneglycol, a glycidylether of an adduct in which an alkyleneoxide is added to bisphenol A, an aliphatic glycidylether, a glycidylether of a urethane-modified bisphenol A, an aliphatic-aromatic copolycondensated glycidylether, vinylcyclohexane dioxide, dicyclopentadiene oxide, a glycidylether of a hydrogenated bisphenol A, and an epoxy-modified polybutadiene, etc. The other epoxy resins may be employed solely or in combination of two or more kinds.

In paving, the asphalt mixture for paving of the fourth aspect in the present invention is employed together with a curing agent for epoxy resins. As the curing agent for epoxy resins, one or more of the component (c) in the first aspect can be employed without any limitation, which is described hereinabove.

Of the curing agents, curing agents having water solubility or water dispersibility can be employed without mixing surface active agents. Curing agents not having water solubility or water dispersibility are employed in a dispersion state in water together with appropriate surface active agents or acids.

The curing agents are mixed in an equivalent ratio of from 0.8/1 to 1.5/1 based on total epoxy equivalent in the epoxy-modified diene-based block copolymer and the above-mentioned other epoxy resin in the modified asphalt emulsion.

Further, a curing accelerator may be also employed, which includes phenol, cresol, an alkyl phenol, salicylic acid, triphenylphosphate, and furfuryl alcohol, etc.

As the thermosetting resin in the emulsion, there may be employed a phenol resin which includes a novolak type phenol resin and a resol type phenol resin. The phenol resin is also emulsified with the emulsifiers described hereinabove. By mixing the emulsion containing a thermosetting resin, a cured layer becomes harder.

The asphalt mixture for paving of the fourth aspect in the present invention is prepared as described below.

First, the modified asphalt emulsion containing an epoxy-modified diene-based block copolymer is prepared as described hereinabove and, optionally, the emulsion containing a thermosetting resin is prepared, and then there are mixed the fillers, the water-hardenable inorganic material, and the aggregates to prepare an asphalt mixture for paving. The curing agents for epoxy resins are separately prepared as an emulsion or an aqueous solution.

The asphalt mixture for paving is mixed with the emulsion or the aqueous solution before working at a site of construction.

Table 1 shows examples of formulation of the asphalt mixture for paving of the fourth aspect in the present invention.

TABLE 1

| Material | Type A | Type B |
|---|---|---|
| Coarse aggregate: No 5 crushed stone | o | — |
| Coarse aggregate: No 6 crushed stone | — | o |
| Fine aggregate: coarse sand | o | o |
| Filler: stone powder | o | o |
| Water-hardenable inorganic materials | o | o |
| Modified asphalt emulsion | o | o |
| Emulsion containing a thermosetting resin | o | o |

A material for paving has a void ratio of 20–30% or so, which is a cured article prepared from the type A of the asphalt mixture for paving shown in the Table 1.

The type A of the material for paving is prepared according to a mixing process as described below.

A desired amount of the No. 5 crushed stone is supplied into a mixer, and then coarse sand, stone powder, and water-hardenable inorganic material are supplied in a desired amount, respectively, to prepare a mixture.

The mixture is dry-blended for 3–5 seconds or so.

Subsequently, there is supplied the modified asphalt emulsion containing an epoxy-modified diene-based block copolymer and, optionally, the emulsion containing a thermosetting resin into the mixture, followed by agitating for approximately 15–25 seconds or so. Subsequently, there is supplied an emulsion or aqueous solution containing a curing agent which is in advance prepared, while agitating to obtain an asphalt mixture for paving. A part of the modified asphalt emulsion may be in advance mixed with the emulsion containing a thermosetting resin.

In the asphalt mixture for paving prepared according to the mixing process as described above, the surface of the aggregates is coated by a layer having high concentration and high viscosity composed of a mixture in which there are mixed asphalt, the epoxy-modified diene-based block copolymer, and the thermosetting resin which is optionally employed. In the layer coated, the water-hardenable inorganic materials and fillers are dispersed, whereby, the layer coated is not dripped or dangled.

Further, an emulsion break in the modified asphalt emulsion is caused due to a hydration reaction by the water-hardenable inorganic materials, whereby, a hard layer is formed over the surface of the aggregates Although water required in the asphalt mixture for paving is sufficiently supplied by water alone derived from the modified asphalt emulsion, in the case that water is short for the hydration reaction by the water-hardenable inorganic materials or in the case that other agents for mixing are mixed, optionally, water may be further supplied for the purpose of controlling viscosity in order to maintain workability.

A material for paving has a void ratio of 15–25% or so, which is a cured article prepared from the type B of the asphalt mixture for paving shown in the Table 1.

The type B of the asphalt mixture for paving is prepared according to the same mixing process as described above, except that the No. 6 crushed stone is employed in place of the No. 5 crushed stone. Still further, the material for paving can be also prepared by the combination of the type A with the type B.

In addition, the asphalt mixture for paving of the fourth aspect can be also prepared by mixing the modified asphalt emulsion and the emulsion or aqueous solution of the curing agent together with the fillers and the water-hardenable inorganic materials after dry-blending of the aggregates alone.

The asphalt mixture for paving of the fourth aspect can be employed as a surface paving layer having water permeability for a sidewalk or a roadway as well as a conventional mixture for paving which is publicly known.

The asphalt mixture for paving of the fourth aspect can be prepared with conventional machines for construction works and methods as well as conventional asphalt mixtures for paving.

However, the asphalt mixture for paving of the fourth aspect is largely different from the conventional asphalt mixtures for paving in view of disuse of heating in paving works.

The asphalt mixture for paving of the fourth aspect can be employed as a paving material for the surface of side walks, general roadways, speedways, pathways in factories, and runways in airports, and it can be employed at ordinary temperatures.

According to a fifth aspect of the present invention, there is provided a cured article. The cured article is prepared by curing the asphalt mixture for paving of the fourth aspect as described hereinabove.

In the following, Examples and Comparative Examples are described in order to specifically illustrate the present invention.

Measurement Method
(1) Pot Life:
A viscosity-time curve is made in relation to a curable composition immediately after mixing, in which viscosity is measured at the period of every 10 minute.

An inflection point in the curve is defined as a pot life in the present invention.

(2) Curing Time of Period:
Approximately 10 g of a curable composition immediately after mixing is cast over a steel plate with the thickness of approximately 1 cm, and it is let alone at ordinary temperatures, and the curing time of period is decided by touching with fingers.

(3) Tensile Strength:
A curable composition immediately after mixing is molded with a mold having a shape shown in JIS K6707 (testing items for tensile strength in relation to laminated plate of a phenol resin), followed by letting it alone at ordinary temperatures for 2 hours, and further letting it alone at 40° C. for 7 days to prepare a test sample.

Temperature of the test sample is maintained at 25° C., and tensile speed is 10 mm/minute.

(4) Oil Resistance:
A curable composition immediately after mixing is cast into a mold having 1 cm×2 cm×5 cm, and it is let alone at ordinary temperatures for 2 hours, and further let it alone at 40° C. for 1 day to prepare a test sample.

The test sample is immersed in a machine oil at 25° C. for 24 hours, followed by visually observing to decide the oil resistance. In the case that a shape of the test sample is maintained without being dissolved, it is decided as "good", and in the case of not being maintained, it is decided as "bad".

(5) Water Resistance:
Test sample is likewise prepared in the test sample for the measurement of oil resistance, and it is immersed in water at 45° C. for 48 hours, followed by visually observing to decide the water resistance.

(6) Marshall Stability Test:
An asphalt mixture for paving is molded as a test sample for Marshall Stability Test by both side-compction of 50 times every one side at ordinary temperatures, followed by letting it alone at a room temperature (20° C.) for 7 days, and then by carrying out Marshall Stability Test (at 60° C. for 30 minutes). Marshall Stability (kg) shows resistibility to plastic flow in an asphalt mixture for paving, and a larger value shows a more advantageous adhesive property of a binder to aggregates.

(7) Wheel Tracking Test:
Test sample (30 cm×30 cm×5 cm) is employed which is molded by a roller compactor. Test is carried out at 60° C. according to Requirements for Asphalt paving, and dead-weight (grounding pressure) is 6.4+0.15 kg/cm$^2$. Dynamic stability is shown as running times per 1 mm-deformation, that is, deformation resistance (times/mm). A larger dynamic stability shows a more advantageous fluidity and a more advantageous stability at high temperatures.

(8) Chain Labeling Test:
It is a test for measuring abrasion resistance of a cured article from an asphalt mixture for paving by vehicles, in which horizontally reciprocating motion is given to test sample while bringing contact with a wheel equipped with a tire chain which is rotated and gone down, and there is abraded the surface of the test sample by the tire chain.

Abraded amount is shown as abraded cross-sectional area (cm$^2$). Test sample having 30 cm×30 cm×5 cm is employed, and temperature in test is −10±1° C., test period is 6–24 hours. A smaller abraded amount shows a more advantageous abrasion resistance and a more advantageous low temperature property.

(9) Softening Point:
It is measured based on JIS K2207.
(10) Penetration Number:
It is measured based on JIS K2207.
(11) Viscosity at 60° C.:
It is measured based on a Method in Petroleum Society.
(12) Kantabro Test:
Test sample is prepared by the same steps as in the Marshall Stability Test, and it is let it alone at a room temperature (20° C.) for 7 days according to Abrasion test of aggregates based on JIS A1121.

Subsequently, the test sample is put in a Los Angels tester, followed by measuring an abraded amount after rotation for 10 minutes (rotation of 30 times).

(13) Water Permeability Test:
Test sample is prepared by the same steps as in the Wheel Tracking Test. After letting it alone at room temperatures for 7 days, water permeability test is carried out according to a method which is conventionally employed in the field of the present invention.

EXAMPLE 1

There were mixed 750 g of straight asphalt having penetration number of 47, 100 g of blown asphalt having penetration number of 17, 150 g of kerosene, and 400 g of dichloropropane to obtain a liquid-state mixture. Subsequently, there were sufficiently mixed 200 g of tar A No. 3 (coal tar, JIS K2472) for paving and 1,000 g of an epoxidized styrene-butadiene-styrene block copolymer (styrene/butadiene weight ratio=3/7, which has oxirane oxygen of 3.81% by weight and a weight average molecular weight of 10,800, in which a styrene-butadiene-styrene block copolymer is epoxidized by peracetic acid) with the liquid-state mixture while agitating to obtain approximately 2,600 g of a mixture which is uniformly dispersed.

Subsequently, there was added 400 g of an amine-based curing agent (m-xylilenediamine) into the mixture, followed by agitating for 5 minutes to obtain approximately 3,000 g of a curable composition. Results are shown in Table 2.

EXAMPLE 2

There were mixed 650 g of straight asphalt having penetration number of 172, 100 g of blown asphalt having penetration number of 17, 300 g of tar B No. 3 (coal tar, JIS K2472) for paving, and 600 g of xylene to obtain a liquid-state mixture. Subsequently, there were sufficiently mixed 1,000 g of an epoxidized styrene-isoprene-styrene block copolymer (styrene/isoprene weight ratio=21/97, which has oxirane oxygen of 4.98% by weight and a weight average molecular weight of 118,000, in which a styrene-butadiene-styrene block copolymer is epoxidized by peracetic acid) with the mixture while agitating to obtain approximately 2,650 g of a mixture which is uniformly dispersed. Subsequently, there was added 400 g of an amine-based curing agent (m-phenylenediamine) into the mixture, followed by agitating for 5 minutes to obtain approximately 3,050 g of a curable composition. Results are shown in Table 2.

EXAMPLE 3

There were mixed 650 g of straight asphalt having penetration number of 172, 100 g of blown asphalt having penetration number of 17, 200 g of tar C No. 1 (coal tar, JIS K2472) for paving, and 600 g of toluene to obtain a liquid-state mixture. Subsequently, there were sufficiently mixed 900 g of an epoxidized styrene-butadiene-styrene block copolymer (styrene/butadiene weight ratio=3/7, which has oxirane oxygen of 3.81% by weight and a weight average molecular weight of 10,800, in which a styrene-butadiene-styrene block copolymer is epoxidized by peracetic acid) and 100 g of a bisphenol A type epoxy resin with the liquid-state mixture while agitating to obtain approximately 2,900 g of a mixture which is uniformly dispersed.

Subsequently, there was added 400 g of an amine-based curing agent (m-phenylenediamine) into the mixture, followed by agitating for 5 minutes to obtain approximately 3,300 g of a curable composition. Results are shown in Table 2.

EXAMPLE 4

There were mixed 750 g of straight asphalt having penetration number of 47, 100 g of blown asphalt having penetration number of 17, 150 g of kerosene, and 400 g of dicyclopropane to obtain a liquid-state mixture. Subsequently, there was sufficiently mixed 1,000 g of an epoxidized styrene-butadiene-styrene block copolymer (styrene/butadiene weight ratio=3/7, which has oxirane oxygen of 3.81% by weight and a weight average molecular weight of 10,800, in which a styrene-butadiene-styrene block copolymer is epoxidized by peracetic acid) with the liquid-state mixture while agitating to obtain approximately 2,400 g of a mixture which is uniformly dispersed. Subsequently, there was added 400 g of an acid anhydride (hexahydrophthalic anhydride) into the mixture, followed by agitating for 5 minutes to obtain approximately 2,800 g of a curable composition. Results are shown in Table 2.

Comparative Example 1

The same procedures as in the Example 1 were repeated, except that there was employed a mixture primarily containing glycidylether of bisphenol A, bisglycidylether, and a urethane-modified epoxy resin in place of the epoxidized styrene-butadiene-styrene block copolymer to obtain a curable composition. Results are shown in Table 2.

TABLE 2

| Testing Item | Example | | | | Comparative Example |
|---|---|---|---|---|---|
| | 1 | 2 | 3 | 4 | 1 |
| Pot life (minute) | 50 | 50 | 50 | 50 | >180 |
| Curing period (minute) | 160 | 160 | 160 | 160 | >180 |
| Tensile strength (Kg/cm$^2$) | 90 | 85 | 95 | 80 | — |
| Oil resistance | E | E | E | E | — |
| Water resistance | E | E | E | E | — |

In the Comparative Example 1, >180 shows that the curable composition was not cured even after 180 minutes at ordinary temperatures. In oil resistance and water resistance, the abbreviation E means "excellent".

EXAMPLE 5

[Preparation Example of the Component (iii) an Epoxy-modified Diene-based Block Copolymer in an Asphalt Emulsion]

A jacketed reaction vessel equipped with an agitator, a reflux condenser and a thermometer was charged with 300 parts by weight of polystyrene-polybutadiene-polystyrene block copolymer [a trade name of "TR2000" manufactured by Japan Synthetic Rubber, Ltd.] and 1500 parts by weight of ethyl acetate, followed by being dissolved. Subsequently, 169 parts by weight of ethyl acetate solution having 30% by weight of peracetic acid was continuously added dropwise, followed by epoxidizing while agitating at 40° C for 3 hours to obtain a reaction product containing an epoxy-modified diene-based block copolymer.

The reaction product was supplied into a ventilation-type extruder to remove solvents at reduced pressure while heating, followed by pelletizing to obtain a polymer having an epoxy equivalent of 520.

There were mixed 100 parts by weight of straight asphalt (having penetration number of 60–80 at 25° C.) heated to approximately 150° C. and 5 parts by weight of the epoxidized styrene-butadiene-styrene block copolymer obtained above to obtain a modified asphalt.

Separately, there were added 1.0 part by weight of stearyl propylenediamine, 0.4 part by weight of acetic acid, and 0.2 part by weight of calcium chloride into 100 parts by weight of water to obtain an emulsion.

Subsequently, there were simultaneously supplied and emulsified the modified asphalt heated at approximately 140° C. and the above-mentioned emulsion heated at approximately 60° C. into a homogenizer to obtain a cationic-based asphalt emulsion showing an excellent emulsifying condition. Water was evaporated from the asphalt emulsion to obtain a residual material. Softening point, penetration number, and viscosity in the residual material are shown in Table 3.

EXAMPLE 6

There were mixed 100 parts by weight of straight asphalt (having penetration number of 60–80 at 25° C.) heated to approximately 150° C., 2 parts by weight of pellets of a polystyrene-polybutadiene-polystyrene (SBS) [a trade name of "TR2000" manufactured by Japan Synthetic Rubber, Ltd.], and 3 parts by weight of pellets of the epoxidized styrene-butadiene-styrene block copolymer obtained above to obtain a modified asphalt.

Separately, there were added 1 part by weight of a rosin soap, 1 part by weight of a tallow soap, and 0.5 part by weight of allylnaphthalene sulphonate into 100 parts by weight of water to obtain an emulsion.

Subsequently, there were simultaneously supplied and emulsified the modified asphalt heated at approximately 140° C. and the above-mentioned emulsion heated at approximately 60° C. into a homogenizer to obtain a cationic-based asphalt emulsion showing an excellent emulsifying condition. Water was evaporated from the asphalt emulsion to obtain a residual material. Softening point, penetration number, and viscosity in the residual material are shown in Table 3.

Comparative Example 2

There were mixed 100 parts by weight of straight asphalt (having penetration number of 60–80 at 25° C.) heated to approximately 150° C. and 5 parts by weight of pellets of the polystyrene-polybutadiene-polystyrene (SBS) [a trade name of "TR2000" manufactured by Japan Synthetic Rubber, Ltd.] to obtain a modified asphalt.

Separately, there were added 0.5 part by weight of sodium lauryl sulphate, and 2.0 parts by weight of polyoxyethylene nonylphenolether, 0.5 part by weight of allylnaphthalene sulphonate into 100 parts by weight of water to obtain an emulsion.

Subsequently, there were simultaneously supplied and emulsified the modified asphalt heated at approximately 140° C. and the above-mentioned emulsion heated at approximately 60° C. into a homogenizer to obtain a cationic-based asphalt emulsion showing an excellent emulsifying condition. Water was evaporated from the asphalt emulsion to obtain a residual material. Softening point, penetration number, and viscosity in the residual material are shown in Table 3.

Comparative Example 3

There were added 1.0 part by weight of stearyl propylenediamine, 0.4 part by weight of acetic acid, and 0.2 part by weight of calcium chloride into 100 parts by weight of water to obtain an emulsion.

Subsequently, there were simultaneously supplied and emulsified a straight asphalt (having penetration number of 60–80 at 25° C.) heated at approximately 140° C. and the emulsion heated at approximately 60° C. into a homogenizer to obtain a modified asphalt showing an excellent emulsifying condition. Water was evaporated from the modified asphalt to obtain a residual material. Softening point, penetration number, and viscosity in the residual material are shown in Table 3.

TABLE 3

|  | A | B | C | D |
|---|---|---|---|---|
| Example 5 | ESBS (5) | 60 | 50 | 8700 |
| Example 6 | ESBS (3) |  |  |  |
|  | SBS (2) | 63 | 53 | 11000 |
| Comparative Example 2 | SBS (5) | 67 | 59 | 15000 |
| Comparative Example 3 | None | 47 | 70 | 2300 |

In the Table 3, the alphabets A–D, abbreviations ESBS and SBS are as follows.
A: Kind and amount of additives (parts by weight)
B: Softening point (° C.)
C: Penetration number (25° C., 1/10 mm)
D: Viscosity (60° C., poise)
ESBS: Epoxy-modified styrene-butadiene-styrene block copolymer
SBS: Styrene-butadiene-styrene block copolymer The residual materials obtained in the Examples 5, 6, Comparative Examples 2 and 3 were mixed with aggregates, etc., respectively, to obtain respective compositions.

The compositions were compacted to prepare test samples for measurements of properties. The aggregates employed are crushed stones No. 6, No. 7, coarse sand, fine sand, and powdered limestone. There were carried out Marshall Stability Test, Wheel Tracking Test, and Chain Labeling Test. Results are shown in Table 4.

TABLE 4

|  | MST | WTT | CLT |
|---|---|---|---|
| Example 5 | 1580 | 15000 | 0.2 |
| Example 6 | 1300 | 9800 | 0.3 |
| Comparative Example 3 | 1100 | 6000 | 0.5 |
| Comparative Example 4 | 920 | 1050 | 0.7 |

In the Table 4, abbreviations are as follows.
MST: Marshall Stability Test (kg)
WTT: Wheel Tracking Test (times/mm)
CLT: Chain Labeling Test (cm$^2$)

From the results in the Table 4, it is identified that the residual materials obtained from the cationic-based asphalt emulsions in the Examples 5 and 6 are more excellent in an adhesive property, flow resistance, and abrasion resistance compared to ones obtained from Comparative Examples 2 and 3.

EXAMPLE 7

There were mixed 70 parts by weight of thermally-melted straight asphalt (having penetration number of 150–200), 5 parts by weight of a process oil, 20 parts by weight of an epoxidized styrene-butadiene-styrene block copolymer, 5 parts by weight of a petroleum resin, and 43 parts by weight of water to obtain a modified asphalt.

The modified asphalt was emulsified by 1 part by weight of stearyl trimethylammonium chloride (a cationic-based surface active agent) to prepare a modified asphalt emulsion (solid content of approximately 70% by weight).

Into a mixer, there were supplied 85 parts by weight of the No. 6 crushed stone, 10 parts by weight of coarse sand, 1 part by weight of stone powder, 4 parts by weight of ultra-rapid strengthening Portland cement (manufactured by Osaka Cement, Ltd.), followed by being dry-blended for approximately 3 seconds, supplying 10 parts by weight of the modified asphalt emulsion while agitating, and mixing for approximately 15 seconds to obtain an asphalt mixture for paving. Results are shown as described below and in Table 5.

(1) Marshall Stability Test:

There were obtained results of 1.990 g/cm³ in Density, 19% in Void ratio, 1,200 kg in Marshall Stability, 12 in Flow value (1/100 cm).

(2) Kantabro Test:

Abrasion amount was 2%.

(3) Wheel Tracking Test:

Density was 2.006 g/cm³, and Dynamic stability (DS) was 15550 times/mm.

(4) Water permeability test:

Water permeability coefficient was $3.1 \times 10^{-1}$ cm/sec.

(5) Chain Labeling Test:

Abrasion amount was 0.4 cm² which is a smaller value compared to 1.5–2.0 cm² in a conventional asphalt concrete.

There was obtained a water permeable mixture for paving having abrasion resistance.

EXAMPLE 8

There were mixed 60 parts by weight of an anionic-based asphalt emulsion (solid content of approximately 70% by weight), 30 parts by weight of the epoxidized styrene-butadiene-styrene block copolymer, 10 parts by weight of an acrylic-based emulsion (a copolymer composed of n-butylacr-ylate, methylmethacrylate, and methylacrylate), and 27 parts by weight of water to obtain a modified asphalt (solid content of approximately 62% by weight).

Into a mixer, there were supplied 85 parts by weight of the No. 5 crushed stone, 10 parts by weight of the coarse sand, 1 part by weight of the stone powder, 4 parts by weight of the ultra-rapid strengthening Portland cement (manufactured by Osaka Cement, Ltd.), followed by being dry-blended for approximately 3 seconds, supplying 10 parts by weight of the modified asphalt emulsion while agitating, and mixing for approximately 20 seconds to obtain an asphalt mixture for paving. Formulations and results are shown in Table 5.

EXAMPLE 9

There were mixed 63 parts by weight of thermally-melted straight asphalt (having penetration number of 150–200), 7 parts by weight of a process oil, 20 parts by weight of the epoxidized styrene-butadiene-styrene block copolymer, 5 parts by weight of a petroleum resin, and 41 parts by weight of water to obtain a modified asphalt.

The modified asphalt was emulsified by 1 part by weight of a polyoxyethylene stearylether (a noionic-based surface active agent) to prepare a modified asphalt emulsion (solid content of approximately 70% by weight).

Into a mixer, there were supplied 34 parts by weight of the No. 5 crushed stone, 51 parts by weight of the No. 6 crushed stone, 10 parts by weight of the coarse sand, 1 part by weight of the stone powder, 4 parts by weight of Lion Highset cement (manufactured by Osaka Cement, Ltd.), followed by being dry-blended for approximately 5 seconds, supplying 10 parts by weight of the modified asphalt emulsion while agitating, and mixing for approximately 20 seconds to obtain an asphalt mixture for paving. Formulations and results are shown in Table 5.

Comparative Example 5

The same aggregates were formulated as in Example 7 except that the cement was replaced with stone powder, followed by heating the aggregates. The same procedures were followed as in Example 7 except that 5 parts by weight of thermally-melted straight asphalt (having penetration number of 60–80) was mixed in place of the modified asphalt. Formulations and results are shown in Table 5.

Comparative Example 6

The same aggregates were formulated as in Example 7 except that the cement was replaced with the stone powder, followed by heating the aggregates. The same procedures were followed as in Example 7 except that 4.8 parts by weight of commercially-supplied asphalt melted by heating at 60° C. (having viscosity of more than 200,000 poise) was mixed in place of the modified asphalt. Formulations and results are shown in Table 5.

TABLE 5

|  | Example | | | Comparative Example | |
|---|---|---|---|---|---|
|  | 7 | 8 | 9 | 5 | 6 |
| Formulation of aggregates (part by weight) | | | | | |
| No. 5 crushed stone *1: | — | — | 85 | 34 | — | — |
| No. 6 crushed stone *1: | | 85 | — | 51 | 85 | 85 |
| Coarse sand *2: | 10 | 10 | 10 | 10 | 10 |
| Stone powder: | 1 | 1 | 1 | 5 | 5 |
| Cement *3: | 4 | 4 | 4 | — | — |
| Binding material | | | | | |
| Straight asphalt *4: | — | — | — | 5 | — |
| Modified asphalt *5: | — | — | — | — | 4.8 |
| Modified asphalt emulsion: | | 10 | 10 | 10 | — | — |
| Marshall Stability Test | | | | | |
| Theoretical density (g/cm³) | 2.410 | 2.410 | 2.410 | 2.455 | 2.466 |
| Density (g/cm³) | | 1.990 | 1.898 | 1.970 | 1.898 | 1.965 |
| Void ratio (%) | 19 | 22 | 20 | 23 | 21 |
| Dynamic stability (kg) | 1200 | 1230 | 1290 | 230 | 610 |

TABLE 5-continued

| | Example | | | Comparative Example | |
|---|---|---|---|---|---|
| | 7 | 8 | 9 | 5 | 6 |
| Flow value (1/100 cm) | 12 | 13 | 13 | 28 | 23 |
| Kantabro test Abraded amount (%) | 2 | 9 | 5 | 49 | 20 |
| Wheel Tracking Test Density (g/cm$^3$) | | 2.006 | 2.922 | 1.988 | 1.902 | 1.998 |
| Deformation resistance (times/mm) | 15550 | 16300 | 16900 | IM | 3500 |
| Water permeability test Water permeability coefficient (cm/sec) | $3.1 \times 10^{-1}$ | $3.8 \times 10^{-1}$ | $2.9 \times 10^{-1}$ | $3.0 \times 10^{-1}$ | $4.0 \times 10^{-1}$ |
| Chain Labeling Test Abrasion amount (cm$^2$) | 0.4 | 0.8 | 0.9 | IM | 10.0 |

Note:
*1: hard sandy stone produced in Kuzuo
*2: produced in Omokawa
*3: manufactured by Osaka Cement Ltd.
*4: straight asphalt for paving (penetration number of 60–80) manufactured by Nihon Sekiyu, Ltd.
*5: commercially supplied ultra-high viscous modified asphalt
In the Wheel Tracking Test and Chain Labeling Test in the Table 5, the abbreviation "IM" means "incapable of measuring".

EXAMPLE 10

The asphalt mixture for paving obtained in the Example 9 was employed for actually paving a road as described below.

A cationic-based asphalt emulsion (solid content of 52% by weight) for permeation was scattered as a tack coat in a proportion of 0.3 liter/m$^2$ over paved surface of a condensed asphalt concrete in operation, followed by spreading in a proportion of 100 kg/m$^2$ over the asphalt mixture for paving obtained in the Example 9 using an asphalt finisher.

The asphalt mixture for paving was supplied from a dump truck into the asphalt finisher as well as a conventional asphalt mixture to be heated.

Compaction was carried out by only vibration of the asphalt finisher, and transcribing compression by a roller was not carried out. The surface of the paved road was flatly finished, a roughed portion was not observed in the surface. At 1 month after beginning of passing of the road, water absorbing when raining is excellent, and there are not observed cracks, a flow phenomenon by load of passing, and an asphalt flush, etc., resulting in that conditions are excellently maintained.

In the comparison between Examples 8–10 and Comparative Examples 5–6, following results are identified.

All of the water permeability coefficient are a grade of 10$^{-1}$ which shows an excellent water permeability, the asphalt mixtures for paving in the Examples 8–10 show 5 times-value in Marshall Stability Test compared to the thermally-melted straight asphalt in the Comparative Example 5, the value of Dynamic stability in the Comparative Example 5 and values of the Abrasion amount in the Chain Labeling Test cannot bear comparison with the values in the Examples 8–10, and the asphalt mixtures for paving in the Examples 8–10 are more excellent also in the Flow value.

The asphalt mixtures for paving in the Examples 8–10 show approximately 2 times-value in Marshall Stability Test, and the values of Dynamic stability of the asphalt mixtures for paving in the Examples 8–10 show approximately 4 times-value, and the asphalt mixtures for paving in the Examples 8–10 are more excellent also in the Flow value at high temperatures in a summer season, compared to the commercially-supplied asphalt in the Comparative Example 6. The values of the Abrasion amount in the Chain Labeling Test are approximately 10-times compared to the value of the commercially-supplied asphalt in the Comparative Example 6, resulting in being more excellent in abrasion resistance.

Preparation Example
(1) Preparation of an Asphalt Emulsion:

There were mixed 75 parts by weight of thermally-melted straight asphalt (having penetration number of 150–200), 20 parts by weight of an epoxidized styrene-butadiene-styrene block copolymer, 5 parts by weight of a petroleum resin, and 43 parts by weight of water, followed by adding stearyl trimethylammonium chloride (a cationic-based surface active agent) to obtain an asphalt emulsion (solid content of approximately 70% by weight).

(2) Preparation of an Emulsion of an Epoxy Resin:

An epoxy resin (Epikote 828, glycidylether of bisphenol A manufactured by Yuka Shell Epoxy, Ltd.) was emulsified with a polyoxyethylene nonylphenylether to obtain an emulsion of an epoxy resin (epoxy resin content of approximately 65% by weight).

Subsequently, there were mixed 47.2 parts by weight of the asphalt emulsion obtained in (1) and 2.8 parts by weight of the emulsion of the epoxy resin obtained in (2) to obtain an emulsion (epoxy resin content of approximately 1.8% by weight). Further, there were likewise mixed 45.7 parts by weight of the asphalt emulsion and 4.3 parts by weight of the emulsion of the epoxy resin to obtain an emulsion (epoxy resin content of approximately 2.8% by weight). Still further, there were likewise mixed 44.4 parts by weight of the asphalt emulsion and 5.6 parts by weight of the emulsion of the epoxy resin to obtain an emulsion (epoxy resin content of approximately 3.6% by weight).

(3) Preparation of an Emulsion for Curing:

25 parts by weight of a neutralized compound (Epicure 3255 manufactured by Yuka Shell Epoxy, Ltd.) in which a self-emulsifying polyamide-based curing agent is neutralized by hydrochloric acid was emulsified with 75 parts by weight of a cationic-based emulsion (Catiosol CME-2 manufactured by Nichireki Kagaku Kogyo, Ltd.) to obtain an emulsion of a curing agent (content of the curing agent component of approximately 15.4% by weight).

Into 38.3 parts by weight of the asphalt emulsion prepared in the (1), 11.7 parts by weight of the emulsion for curing prepared in the (3) was added and mixed to obtain an emulsion of a curing agent (content of the curing agent component of approximately 1.8% by weight).

There were likewise mixed 32.5 parts by weight of the asphalt emulsion and 17.5 parts by weight of the emulsion of a curing agent to obtain an emulsion for curing having content of the curing agent of approximately 2.8% by weight.

There were likewise mixed 26.6 parts by weight of the asphalt emulsion and 25.4 parts by weight of the emulsion of a curing agent to obtain an emulsion for curing having content of the curing agent of approximately 3.6% by weight.

EXAMPLE 11

Into a mixer, there were supplied 85 parts by weight of the No. 6 crushed stone, 11.3 parts by weight of the coarse sand, and 3.2 parts by weight of the Lion Highset cement (manufactured by Osaka Cement, Ltd.), followed by being dry-blended for approximately 3 seconds, supplying 8 parts by weight of a mixture in which there are mixed the epoxy resin emulsion (content of the epoxy resin component of approximately 1.8% by weight) and the emulsion of a curing agent (content of the curing agent component of approximately 1.8% by weight) with a mixing proportion shown in Table 6, and mixing for approximately 15 seconds to obtain an asphalt mixture for paving.

The asphalt mixture for paving was employed to obtain a cured article. Properties of the cured article were measured.
(1) Marshall Stability Test:
There were obtained results of 2.012 g/cm$^3$ in Density, 17.4% in Void ratio, 1,530 kg in Marshall Stability, 20 in Flow value (1/100 cm).
(2) Wheel Tracking Test:
Density was 1.988 g/cm$^3$, and Dynamic stability (DS) was 20,500 times/mm.
(3) Kantabro Test:
Abrasion amount was 12%.
(4) Water Permeability Test:
Water permeability coefficient was $5.8 \times 10^{-1}$ cm/sec.
(5) Chain Labeling Test:
Abrasion amount was 0.5 cm$^2$ which is a smaller value compared to 1.5–2.0 cm$^2$ in a conventional asphalt concrete.

There was obtained a water permeable mixture for paving having abrasion resistance.

Formulations and results are shown in Table 7.

EXAMPLE 12

The same procedures were followed as in Example 11 except that there were employed the epoxy resin emulsion (content of the epoxy resin component of approximately 2.8% by weight) in place of the epoxy resin emulsion (content of the epoxy resin component of approximately 1.8% by weight), and the emulsion of a curing agent (content of the curing agent component of approximately 2.8% by weight) in place of the emulsion of a curing agent (content of the curing agent component of approximately 1.8% by weight) to obtain an asphalt mixture for paving.

The asphalt mixture for paving was employed to obtain a cured article. Properties of the cured article were measured. Formulations and results are shown in Tables 6 and 7.

EXAMPLE 13

The same procedures were followed as in Example 11 except that there were employed the epoxy resin emulsion (content of the epoxy resin component of approximately 3.6% by weight) in place of the epoxy resin emulsion (content of the epoxy resin component of approximately 1.8% by weight), and the emulsion of a curing agent (content of the curing agent component of approximately 3.6% by weight) in place of the emulsion of a curing agent (content of the curing agent component of approximately 1.8% by weight) to obtain an asphalt mixture for paving.

The asphalt mixture for paving was employed to obtain a cured article. Properties of the cured article were measured. Formulations and results are shown in Tables 6 and 7.

Comparative Example 7

There were mixed the crushed stone, the coarse sand, and the stone powder with a mixing proportion as shown in Table 6 to obtain an aggregates mixture.

There was mixed 5 parts by weight of thermally-melted straight asphalt (having penetration number of 60–80) with the aggregates mixture to obtain an asphalt mixture for paving. The asphalt mixture for paving was employed to obtain a cured article. Properties of the cured article were measured. Formulations and results are shown in Tables 6 and 7.

Comparative Example 8

There were mixed the crushed stone, the coarse sand, and the stone powder with a mixing proportion as shown in Table 6 to obtain an aggregates mixture.

There was mixed 4.8 parts by weight of commercially-supplied asphalt (having viscosity of more than 200,000 poise when melted by heating at 60° C.) was mixed with the aggregates mixture to obtain an asphalt mixture for paving.

The asphalt mixture for paving was employed to obtain a cured article. Properties of the cured article were measured. Formulations and results are shown in Tables 6 and 7.

TABLE 6

|  | Example | | | Comparative Example | |
|---|---|---|---|---|---|
|  | 11 | 12 | 13 | 7 | 8 |
| Materials (part by weight) | | | | | |
| No. 6 crushed stone *1 | 85.0 | 85.0 | 85.0 | 85.0 | 85.0 |
| Coarse sand *2 | 11.3 | 11.3 | 11.3 | 11.3 | 11.3 |
| Stone powder | — | — | 3.7 | 3.7 | — |
| Carbon black | 0.5 | 0.5 | 0.5 | — | — |
| Lion Highset *3 | 3.2 | 3.2 | 3.2 | — | — |
| Straight asphalt *4 | — | — | — | 5 | — |
| Modified asphalt *5 | — | — | — | — | 4.8 |
| Epoxy resin emulsion | | | | | |
| Epoxy resin component of 1.8% by weight | 4 | — | — | — | — |
| Epoxy resin component of 2.8% by weight | — | 4 | — | — | — |
| Epoxy resin component of 3.6% by weight | — | — | 4 | — | — |

TABLE 6-continued

|  | Example | | | Comparative Example | |
|---|---|---|---|---|---|
|  | 11 | 12 | 13 | 7 | 8 |
| Emulsion for curing | | | | | |
| Curing agent component of 1.8% by weight | 4 | — | — | — | — |
| Curing agent component of 2.8% by weight | — | 4 | — | — | — |
| Curing agent component of 3.6% by weight | — | — | 4 | — | — |

Note:
*1: hard sandy stone produced in Kuzuo
*2: produced in Omokawa
*3: manufactured by Osaka Cement Ltd.
*4: straight asphalt for paving (penetration number of 60–80) manufactured by Nihon Sekiyu, Ltd.
*5: commercially supplied ultra-high viscous modified asphalt

TABLE 7

|  | Example | | | Comparative Example | |
|---|---|---|---|---|---|
|  | 11 | 12 | 13 | 7 | 8 |
| Marshall Stability Test | | | | | |
| Theoretical density (g/cm$^3$) | 2.434 | 2.434 | 2.439 | 2.455 | 2.465 |
| Density (g/cm$^3$) | 2.012 | 2.006 | 2.007 | 1.915 | 1.947 |
| Void ratio (%) | 17.4 | 17.3 | 17.5 | 22.0 | 21.0 |
| Stability (kg) | 1530 | 1500 | 1560 | 220 | 610 |
| Flow value (1/100 cm) | 20 | 19 | 24 | 28 | 23 |
| Wheel Tracking Test | | | | | |
| Density (g/cm$^3$) | 1.988 | 1.985 | 1.979 | 1.932 | 1.998 |
| Deformation resistance (times/mm) | 20500 20500 | 20500 20500 | 20500 20500 | IM IM | 3600 3600 |
| Kantabro test Abraded amount (%) | 12 | 14 | 6 | 49 | 20 |
| Water permeability test Water permeability coefficient (cm/sec) | 5.8 × 10$^{-2}$ | 5.9 × 10$^{-2}$ | 6.1 × 10$^{-2}$ | 4.0 × 10$^{-2}$ | 5.9 × 10$^{-2}$ |
| Chain Labeling Test Abrasion amount (cm$^2$) | 0.5 | 0.4 | 0.3 | IM | 10 |

It is identified that the asphalt mixtures for paving of the Examples 11–13 are excellent compared to the Comparative Examples 7–9 in a variety of properties.

While the invention has been described in detail and with reference to specific embodiments thereof, it will be apparent to one skilled in the art that various changes and modifications can be made therein without departing from the spirit and scope thereof.

What is claimed is:

1. A curable composition which comprises (a) 10–90% by weight of an epoxy-modified diene-based block copolymer containing a polymer block consisting of an aromatic vinyl compound and a polymer block consisting of a compound having a conjugated double bond, in which unsaturated double bonds are partially epoxidized, (b) 90–10% by weight of asphalt mixed with tar, and (c) a curing agent for an epoxy-based resin.

2. A curable composition wherein 1–100 parts by weight of tar is mixed with 100parts by weight of a curable composition comprising (a) 10–90% by weight of an epoxy-modified diene block copolymer consisting of an aromatic vinyl compound and a polymer block consisting of a compound having a conjugated double bond, in which unsaturated double bonds are epoxidized, (b) 90–10% by weight of asphalt, and (c) a curing agent for an epoxy-based resin.

3. A curable composition as set forth in claim 1, wherein said curing agent is an amine or an organic acid anhydride.

4. A curable composition as set forth in claim 1, wherein said epoxy-modified aromatic vinyl-conjugated diene block copolymer has an epoxy equivalent of 140 to 2,700.

5. A curable composition as set forth in claim 1, wherein there is mixed at least one selected from the group consisting of a bisphenol A epoxy resin, a bisphenol F epoxy resin, a cresol novolak epoxy resin, an cycloaliphatic epoxy resin, and a phenol novolak type epoxy resin together with said epoxy-modified aromatic vinyl-conjugated diene block copolymer.

6. A cured article molded from a curable composition as set forth in any one of claims 1–6.

7. An asphalt emulsion which comprises; (i) 100 parts by weight of asphalt, (ii) 5–100 parts by weight of an epoxy-modified diene-based block copolymer containing a polymer block consisting of an aromatic vinyl compound and a polymer block consisting of a compound having a conjugated double bond, in which unsaturated double bonds are partially epoxidized, (iii) 30–800 parts by weight of water, and (iv) 0.06–8 parts by weight of an emulsifier.

8. An asphalt emulsion as set forth in claim 7, wherein there is additionally employed a condensate between a compound containing bisphenol A unit and an epihalohydrin together with said epoxy-modified diene-based block copolymer.

9. An asphalt mixture for paving which comprises 1–5 parts by weight of fillers, 1–15 parts by weight of a water-hardenable inorganic material, 2–15 parts by weight of a modified asphalt emulsion containing an epoxy-modified diene-based block copolymer, and 100 parts by weight of aggregates.

10. An asphalt mixture for paving as set forth in claim 9, wherein the surface of said aggregates is coated by an asphalt emulsion as set forth in claim 7.

11. An asphalt mixture for paving as set forth in claim 7, wherein 0.2–3 parts by weight of an emulsion containing a thermosetting resin is additionally mixed based on 100 parts by weight of aggregates.

12. An asphalt mixture for paving as set forth in claim 7, wherein fillers and a water-hardenable inorganic material are dispersed in a mixture composed of an asphalt emulsion and an emulsion containing a thermosetting resin, and the surface of said aggregates is coated by said mixture.

13. A cured article molded from an asphalt mixture for paving as set forth in any one of claims 7–12.

* * * * *

UNITED STATES PATENT AND TRADEMARK OFFICE
CERTIFICATE OF CORRECTION

PATENT NO. : 5,925,695
DATED : July 20, 1999
INVENTOR(S) : Yoshihiro OHTSUKA and Yasuhiro OSHINO It is certified that error appears in the above-identified patent and that said Letters Patent is hereby corrected as shown below:

At Col. 29, line 65, after "diene" insert --based--.

At Col. 30, line 1, after "are" insert --partially--.

Signed and Sealed this

Seventh Day of December, 1999

Attest:

Q. TODD DICKINSON

Attesting Officer

Acting Commissioner of Patents and Trademarks